United States Patent

Eisenstadt

[15] 3,647,483

[45] Mar. 7, 1972

[54] CYCLAMATE-FREE CALORIE-FREE SWEETENER

[72] Inventor: Marvin E. Eisenstadt, Belle Harbor, N.Y.

[73] Assignee: Cumberland Packing Corporation, Brooklyn, N.Y.

[22] Filed: Mar. 30, 1970

[21] Appl. No.: 23,987

Related U.S. Application Data

[63] Continuation-in-part of Ser. No. 869,383, Oct. 24, 1969, abandoned.

[52] U.S. Cl. ............................................................99/141 A
[51] Int. Cl. ...............................................................A23l 1/26
[58] Field of Search............................99/28, 78, 141, 141 A

[56] References Cited

UNITED STATES PATENTS 3,259,506  7/1966  Eisenstadt................................99/141
3,285,751  11/1966  Kracaver..................................99/141
3,489,572  1/1970  Kracaver..................................99/141

*Primary Examiner*—Raymond N. Jones
*Assistant Examiner*—Roger B. Andervelt
*Attorney*—Steinberg and Blake

[57] ABSTRACT

This invention relates to noncaloric saccharine artificial sweetening compositions, and more particularly to sweetening compositions which are free of cyclamate, contain only saccharine as the artificial sweetener, but which contain additives which do not add calories but nevertheless eliminate the undesired bitter aftertaste of the saccharine. The additives which are used according to this invention, and which must be used in combination because the only sweetening agent is saccharine, are glucono delta lactone, sodium gluconate and/or potassium gluconate and cream of tartar powder (potassium bitartrate).

4 Claims, No Drawings

CYCLAMATE-FREE CALORIE-FREE SWEETENER

CROSS-REFERENCE TO RELATED APPLICATION

This application is a continuation-in-part of my copending application, Ser. No. 869,383, filed Oct. 24, 1969, for "Cyclamate-Free Calorie-Free Sweetener," now abandoned.

BACKGROUND OF THE INVENTION

The use of artificial sweeteners in place of sugar for the reduction of caloric intake, for medical reasons and for simple dietary reasons, is well known. The most common artificial sweeteners are the saccharines and the cyclamates (which latter are sold under the trademark "Sucaryl").

Both of the above groups of substances are much sweeter than sugar and have no caloric value. However, both of the groups of substances suffer from the disadvantage of leaving a bitter aftertaste in the mouth of the user and very often a saccharine and a cyclamate are used together in order to lower the degree of bitter aftertaste of the sweeteners.

The cyclamates have about 30 times the sweetening power of pure sugar (when referring to sugar what is meant always is a normal cane sugar or beet sugar which is used commercially for sweetening and which actually consists mainly of sucrose).

The saccharines have a much higher degree of sweetening power, namely 300 times the sweetening power of sugar. The saccharines, however, have an even greater bitter aftertaste than the cyclamates, and the saccharines are most often not used alone, but rather in admixture with a cyclamate. Recently there have been reports that the cyclamates have undesired physiological side effects, and while these reports are far from being confirmed, nevertheless the public has become wary about using any products with the cyclamates. Thus, there have been reports that a certain percentage of people metabolize the cyclamates into cancer-producing compounds which cause cancer of the liver and kidney. There have been other reports that the cyclamates have an undesired effect on the chromosomes so that it is believed that the cyclamates could have a potentially bad effect on future offspring. There are other reports that cyclamates might have an effect on pregnant women which would undesirably affect the fetus.

As stated above, these reports have not been substantiated. Nevertheless, it is apparent in view of these reports and in view of the publicity which these reports have received that it is desirable to provide artificial sweetening products which do not contain cyclamates, but which also do not have the undesired bitter aftertaste of saccharine.

In my copending application, Ser. No. 874,413, filed Nov. 5, 1969, I describe a composition of saccharine, lactose and cream of tartar powder for achieving satisfactory sweetening using saccharine alone as the artificial sweetener, without bitter aftertaste. However, such product contains calories because of the presence of lactose and in fact the equivalent of two teaspoons of sugar would contain about three calories. While this is of course extremely little as far as calories are concerned, three calories are undesirable, particularly in the case of diabetics who might use large amounts of sweetening and who would not wish to use large amounts of sweetening and who would not wish to upset their carbohydrate intake in any way.

SUMMARY OF THE INVENTION

Generally speaking, in accordance with the present invention, a composition is provided of saccharine, glucono delta lactone, sodium gluconate and/or potassium gluconate and cream of tartar powder (potassium bitartrate). This composition avoids the bitter aftertaste of the saccharine which would occur using saccharine alone as the artificial sweetener, and at the same time provides no calories so that the composition can be used freely by diabetics.

It is accordingly a primary object of the present invention to provide a sweetening composition which contains only a saccharine as the artificial sweetener but does not have any bitter aftertaste of the saccharine and also has no calories whatsoever, so that the same can be used freely by all persons wishing to reduce their caloric intake and with all types of food.

It is yet a further object of the present invention to provide compositions of a saccharine, blucono delta lactone, sodium gluconate and/or potassium gluconate and cream of tartar powder which have no undesired bitter after-taste and which can be used with all types of food while providing only a sweetening effect on food which is akin to that of natural sugar.

It is another object of the present invention to provide a cyclamate-free, calorie-free, sodium-free sweetening composition which can thus be used by all persons, including diabetics and those with high blood pressure, and which nevertheless has no undesired bitter aftertaste.

Other objects and advantages of the present invention will be apparent from further reading of the specification and of the appended claims.

The term "saccharine artificial sweetener" as used throughout the specification and claims of this case is meant to refer to saccharine itself and the salts thereof such as sodium saccharine, potassium saccharine, calcium saccharine, etc.

In accordance with the present invention, the saccharine artificial sweetener is mixed with the cream of tartar powder and with the glucono delta lactone and sodium gluconate and/or potassium gluconate in a ratio of one part of saccharine artificial sweetener to one-eighth to 5 parts of cream of tartar powder (most preferably one-sixth to 2 parts), with 2–10 parts of a physiologically acceptable, soluble gluconic acid salt, such as sodium gluconate and potassium gluconate (most preferably 3–7 parts) and with 3–15 parts of glucono delta lactone (most preferably 5–10 parts). All parts herein are parts by weight. When these components are used in these proportions, the most desired effect of sweetness approaching that of natural sugar without any bitter aftertaste and without any undesired effect on any food or beverage to which the sweetening composition is used, are obtained.

The present invention provides the possibility of having a cyclamate-free, calorie-free, sodium-free artificial sweetening composition without any bitter aftertaste. Such composition comprises, in the same proportions as indicated above, the use of potassium saccharine or calcium saccharine as the saccharine artificial sweetener, plus glucono delta lactone plus potassium gluconate as the soluble gluconic acid salt, plus cream of tartar (potassium bitartrate).

It should be noted that all of the components of the composition of this invention must be used in combination in order to achieve the desired results. Thus, the use of glucono delta lactone alone or even glucono delta lactone plus the gluconate e.g., sodium gluconate and/or potassium gluconate) with the saccharine artificial sweetener, the resulting composition cannot be used for the sweetening of milk or milk products because of a danger of curdling. Furthermore, the sweetening of coffee, tea or any other drink containing tannic acid and/or caffeine cannot be accomplished with such composition without causing discoloration.

On the other hand, if cream of tartar powder alone is used with the saccharine artificial sweetener, it is not possible to mask the bitter aftertaste of the saccharine. It is only by using the cream of tartar powder together with the gluconate and the glucono delta lactone in the proportions indicated above, that it is possible to obtain a complete masking of the bitter aftertaste of the saccharine without adversely affecting the taste of any food or beverage to which the composition is applied while still obtaining a sweetening composition which is entirely free of calories.

DESCRIPTION OF PREFERRED EMBODIMENTS

The following examples are given to further illustrate the present invention.

The scope of the invention is not, however, meant to be limited to the specific details of the examples.

EXAMPLE 1

Fifteen lbs. of glucono delta lactone, 5 lbs. of sodium gluconate, 1 lb. of soluble saccharine and 2 lbs. of potassium bitartrate are thoroughly and uniformly mixed.

The resulting mixture is many times as sweet as natural sugar so that a small amount thereof can be used in place of sugar to give a sweetening effect without providing any calories. Approximately 1 gram of the composition will give the sweetening effect of two teaspoons of sugar. This composition can be used to sweeten beverages or in cooking, in all quantities even to highly sweeten beverages, without causing any bitter aftertaste and without adversely affecting the taste of the food or beverage to which it is applied.

EXAMPLE 2

A sweetening composition is prepared as in Example 1, however using 5 lbs. of potassium gluconate, 5 lbs. of glucono delta lactone, 1 lb. of saccharine and one-half lb. of potassium bitartrate.

Approximately 1 gram of the above product gives the sweetening power approximating that of two teaspoons of sugar.

EXAMPLE 3

A composition is prepared as in Example 1, however, using 6 lbs. of glucono delta lactone, 4 lbs. of sodium gluconate, 10 oz. of sodium saccharine and 2 oz. of potassium bitartrate.

Each gram of the above product gives approximately the sweetening power of two teaspoons of sugar. The product contains no calories.

EXAMPLE 4

A sweetening composition is prepared as in Example 1, however using 3 lbs. of glucono delta lactone, 8 lbs. of sodium gluconate, one-half lb. of saccharine, and 1 lb. of potassium bitartrate.

Approximately 0.5 grams of the above product is used to obtain the sweetening of two teaspoons of ordinary sugar.

EXAMPLE 5

A sweetening composition is prepared as in Example 1, however using 300 lbs. of glucono delta lactone, 200 lbs. of potassium gluconate, 36 lbs. of calcium saccharine and 6 lbs. 4 ounces of potassium bitartrate.

This composition contains no carbohydrates, no calories, no cyclamates and no sodium. Approximately 0.024 ounces of the above product is used to obtain the sweetening equivalence of two teaspoons of ordinary sugar.

Any of the above compositions may be used for the sweetening of beverages, in baking, preparing cooked fruits, in cooking, in making candies, etc.

What is claimed is:

1. A sweetening composition consisting essentially of a saccharine artificial sweetener, glucono delta lactone, a gluconic acid salt selected from the group consisting of sodium gluconate and potassium gluconate, and potassium bitartrate, in proportions by weight of 3–15 parts of glucono delta lactone, 2–10 parts of said gluconic acid salt, and one-eighth to 5 parts of potassium bitartrate per each part of saccharine artificial sweetener.

2. A composition according to claim 1 wherein the proportions of the components are 5–10 parts of glucono delta lactone, 3–7 parts of said gluconic acid salt, and one-sixth to 2 parts of potassium bitartrate per each part of saccharine artificial sweetener.

3. Composition according to claim 1 wherein said saccharine artificial sweetener is selected from the group consisting of potassium saccharine and calcium saccharine and wherein said gluconic acid salt is potassium gluconate.

4. Composition according to claim 3 wherein said saccharine artificial sweetener is calcium saccharine.

* * * * *